Figure 1:
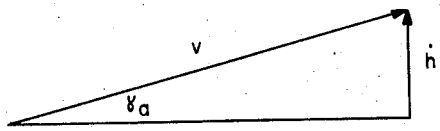

Sept. 1, 1964  H. MILLER  3,147,424
APPARATUS FOR CONTROLLING THE VERTICAL RATE OF AN AIRCRAFT
Filed Dec. 22, 1961

INVENTOR.
HARRY MILLER
BY
ATTORNEY

United States Patent Office 3,147,424
Patented Sept. 1, 1964

3,147,424
APPARATUS FOR CONTROLLING THE VERTICAL RATE OF AN AIRCRAFT
Harry Miller, Scottsdale, Ariz., assignor to Sperry Rand Corporation, Great Neck, N.Y., a corporation of Delaware
Filed Dec. 22, 1961, Ser. No. 161,610
3 Claims. (Cl. 318—489)

This invention relates to flight control apparatus and more particularly to apparatus for use in controlling an aircraft so that it assumes and maintains a course making a particular angle with respect to the earth, i.e., the craft maintains a desired flight path angle.

Prior art apparatus that provide such path angle control, e.g. the apparatus shown and described in U.S. Patent 2,896,145, filed in the name of R. Snodgrass and assigned to the present assignee, in general equate signals representing actual, i.e. instantaneous, craft flight path angles to signals representing desired, i.e. commanded, flight path angles, thereby producing respective error signals. By so flying a craft that its flight path angle error signal is cancelled, a course having the desired path angle is assumed.

In aircraft maneuvering, altitude (being of prime importance for safety reasons) must be controlled accurately and continually. Whereas prior art flight path angle control apparatus ignore direct consideration of altitude (controlling it only indirectly through their respective flight path angle computations), apparatus embodying the present invention places emphasis on altitude while providing flight path angle control without ever producing a signal representing the actual flight path angle of the craft. In general, this is done by equating a signal proportional to altitude rate to a "modified" desired flight path angle signal to produce an error signal; by causing the craft vertical rate to be such that the error signal is cancelled, the desired flight path angle is assumed. Modification of the desired flight path angle signal is achieved by varying it as a function of the craft forward velocity, such modification being justified by and in accord with the expression $$\frac{\dot{h}}{v} \simeq \gamma_a$$

(for small flight path angles), where $\dot{h}$, $v$, and $\gamma_a$ represent respectively the craft actual vertical rate, forward velocity and flight path angle; when the actual instantaneous flight path angle $\gamma_a$ equals the desired flight path angle $\gamma_c$, i.e. the desired situation, the product $v\gamma_c$ (which is representative of the aforementioned "modified" desired flight path angle) equals $\dot{h}$.

A principal object of the present invention is to provide flight path angle control apparatus that places emphasis on altitude control.

Another object of the invention is to provide flight path angle control apparatus that does not require computation of the actual flight path angle of the craft.

Another object of the invention is to provide flight path angle control apparatus that relies therefor on static and dynamic pressure.

Figure 2:
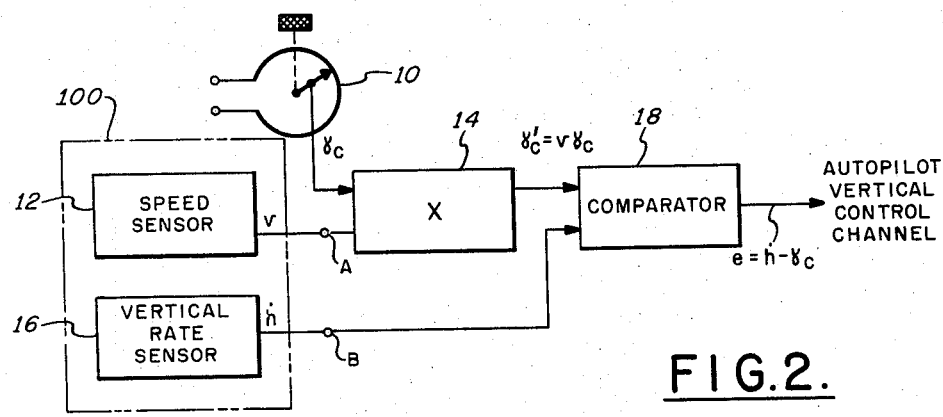
Figure 3:
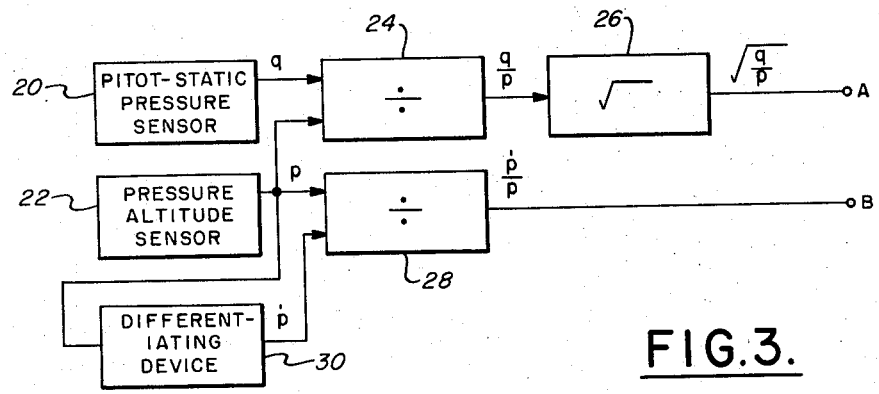
Figure 4:
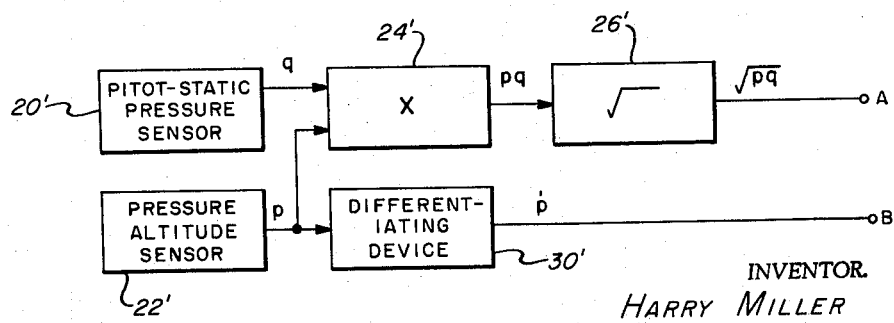

The invention will be described with reference to the figures wherein:

FIG. 1 is a diagram useful in describing the invention,
FIG. 2 is a block diagram of one form of the invention,
FIG. 3 is a block diagram of a circuit adapted to be substituted for part of the apparatus of FIG. 2 to provide another form of the invention, and
FIG. 4 is a block diagram of another circuit adapted to be substituted for part of the apparatus of FIG. 2 to provide still another form of the invention.

The flight path angle $\gamma_a$ of an aircraft may be derived from the craft forward velocity $v$ and rate of climb $\dot{h}$, $\gamma_a$ substantially equalling the ratio of rate of climb $\dot{h}$ to craft forward velocity $v$ for small values of $\gamma_a$. See FIG. 1. With this in mind, reference should be had to FIG. 2 which shows a potentiometer 10, adapted to be set manually by the pilot, providing a signal $\gamma_c$ representing a desired flight path angle. A speed sensor 12 (one type of which is described later) provides a forward velocity signal $v$ which, together with the signal $\gamma_c$, is applied to a multiplier 14. The multiplier 14 produces a signal $\gamma_c'$, i.e. a modified $\gamma_c$ signal, representing the product of the signals $v$ and $\gamma_c$. A vertical rate sensor 16 (a form of which is described later) provides a rate of climb signal $\dot{h}$ which is applied to a comparator 18, the comparator 18 receiving also the modified desired path angle signal $\gamma_c'$. The comparator 18 then produces an error signal representing the difference between the climb rate signal and the modified path angle signal, such error signal being adapted to be applied to the vertical control channel of the craft autopilot to cause the craft to maintain the desired flight path angle.

On examination, it is seen that when the compartor 18 provides no output error signal the altitude rate signal $\dot{h}$ exactly equals the modified flight path angle signal $\gamma_c'$ (and the craft has the desired flight path angle $\gamma_c$). By substituting for the modified flight path angle signal $\gamma_c'$ its equivalent ($v\gamma_c$), it becomes apparent that the comparator 18 computation ($\gamma_c' = \dot{h}$) is reducible to the prior art computation $\gamma_c = \gamma_a$; however, as noted above, computation of the actual flight path angle of the craft is never effected.

FIG. 3 shows apparatus that provides signals representative of the craft forward velocity and rate of climb from data readily available in most flight control system installations, i.e. from measurements of pitot-static and static pressures. As is known (see Equations 2:14, Airplane Aerodynamics, Dommasch, Sherby and Connolly, Pitman Publishing Corporation, New York), a signal representing the forward velocity of an aircraft may be provided by taking the square root of a signal representing the ratio of pitot-static pressure $q$ to a term directly related to air density, e.g. static pressure $p$; also known (see Equation 1:7 of the aforementioned publication) is that altitude rate $\dot{h}$ may be derived from the ratio of the rate of change of static pressure $\dot{p}$ to static pressure $p$. Accordingly, a sensor 20 providing a pitot-static, or dynamic, pressure signal $q$, and a pressure altitude sensor 22, e.g. the apparatus shown and described in application Serial No. 49,365, filed in the name of William Topazio et al. and assigned to the present assignee, providing a static pressure signal $p$, apply their respective signals to a divider 24. The divider 24 applies its output signal $$\frac{q}{p}$$

to a square root extracting device 26, e.g. the circuit shown and described on page 686, vol. 19, Radiation Laboratory Series, Massachusetts Institute of Technology, McGraw-Hill Book Co., New York, that produces the signal $$\sqrt{\frac{q}{p}}$$

The static pressure signal $p$ is applied also to a divider 28 and to a differentiating device 30. The differentiating device 30 applies its output signal $\dot{p}$ to the divider 28, thereby causing the divider to produce an output signal $$\frac{\dot{p}}{p}$$

By connecting the apparatus of FIG. 3 to the points A and B of FIG. 2 instead of the apparatus enclosed within the dashed lines 100 of that figure, the desired flight path angle signal $\gamma_c$ is varied as a function of $$\sqrt{\frac{q}{p}}$$

and then compared with the signal $$\frac{\dot{p}}{p}$$

to produce an error signal for controlling the craft in the manner hereinbefore mentioned.

FIG. 4 shows apparatus that provides the presently preferred form of the invention (because it further simplifies the equipment necessary to provide flight path angle control in the manner taught by the invention) which varies the commanded flight path angle signal $\gamma_c$, not as a function of a signal representing the craft forward velocity, but as a function of a signal "proportional" to forward velocity; also, with such apparatus the modified path angle signal is compared, not with a signal representing vertical rate, but with a signal "proportional" to vertical rate. As inferred by the discussion relating to FIG. 3, $$\gamma_a = \frac{\dot{p}}{p} \div \sqrt{\frac{q}{p}}$$

which, when reduced to its simplest form results in $\gamma_a = \dot{p} \div \sqrt{pq}$, the craft forward velocity and climb rate being proportional respectively to $\sqrt{qp}$ and $\dot{p}$.

With the apparatus of FIG. 4 connected to points A and B of FIG. 1 in place of the apparatus enclosed within the dashed lines 100, the desired flight path angle $\gamma_c$ is modified as a function of $\sqrt{pq}$; then the flight path angle signal so modified is compared with the rate of change of altitude signal $\dot{p}$ to produce an error signal. As shown, the apparatus of FIG. 4 has a pitot-static pressure sensor 20' which applies its output signal $q$ to a multiplier 24'. Also applied to the multiplier 24' is a static pressure signal $p$ derived from a sensor 22'. The multiplier output signal $pq$ is applied then to a square root extracting device 26' that produces the signal $\sqrt{pq}$. The static pressure sensor 22' also applies its output signal to a differentiating device 30' to produce the rate signal $\dot{p}$.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for controlling the vertical rate of a craft so that said craft flies at a particular commanded flight path angle comprising means producing a signal representing the commanded flight path angle of said craft, pitot-static pressure sensing means producing a signal when said craft moves substantially in the direction of its longitudinal axis, means sensing static pressure producing a representative signal thereof, means producing a signal representing the rate of change of static pressure, means receiving said static and pitot-static pressure signals producing a modifying signal representing the square root of their product, means receiving said flight path angle and modifying signals producing an output signal proportional to their product, and means algebraically adding said rate of change of static pressure signal to said product signal to produce an error signal, whereby said craft may be made to fly at said commanded flight path angle by keeping the rate of change of pressure signal such that said error signal is zero.

2. Apparatus for controlling the vertical rate of a craft so that said craft flies at a particular commanded flight path angle comprising means producing a signal representing the flight path angle of said craft, pitot-static sensing means producing a signal when said craft has a forward velocity, means producing a signal representing static pressure, means producing a signal representing the rate of change of the static pressure, means receiving both said pressure signals producing a signal representing the square root of their product, means receiving said square root signal and said flight path angle signal producing a signal representing their product, and means comparing said product signal with said pressure rate signal producing an error signal representing the difference therebetween, whereby said difference signal is adapted to be used in controlling the craft in the vertical plane and thereby cause the craft to maintain said desired flight path angle.

3. Flight path angle control apparatus for use in controlling an aircraft comprising means for producing a signal representing a desired flight path angle, means for producing a signal proportional to the square root of pitot-static pressure, means for producing a signal proportional to the rate of change of static pressure, means for receiving said square root signal and said desired flight path angle signal modifying said path angle signal as a direct function of said square root signal, and means for comparing said modified path angle signal with said signal proportional to the rate of change of static pressure to produce an error signal, said error signal being proportional to the craft angular displacement from the desired flight path angle and being useful in controlling the craft to fly at that angle.

References Cited in the file of this patent
UNITED STATES PATENTS
2,896,145    Snodgrass _____ July 21, 1959